United States Patent [19]

Sankrithi

[11] Patent Number: 4,508,380
[45] Date of Patent: Apr. 2, 1985

[54] TRUCK AFTERBODY DRAG REDUCING DEVICE

[76] Inventor: Mithra M. K. V. Sankrithi, 417 Bellevue Way SE. #400, Bellevue, Wash. 98004

[21] Appl. No.: 409,938

[22] Filed: Aug. 20, 1982

[51] Int. Cl.³ .................. B62D 35/00; B60P 1/00
[52] U.S. Cl. ..................... 296/1 S; 296/27; 105/2 R
[58] Field of Search .......... 296/1 S, 91, 165, 172, 296/176, 27, 26, 181, 183; 52/64, 71; D12/82, 93, 97, 102, 104; 105/2 R

[56] References Cited

U.S. PATENT DOCUMENTS

| | | | |
|---|---|---|---|
| 2,146,297 | 2/1939 | Huet | 105/2 R |
| 3,070,400 | 12/1962 | Rivers | 296/183 |
| 3,348,622 | 10/1967 | Papst | 296/1 S |
| 3,399,794 | 9/1968 | Hummel | 296/183 |
| 3,724,892 | 4/1973 | Ridder et al. | 296/1 S |
| 4,236,745 | 12/1980 | Davis | 296/1 S |
| 4,257,641 | 3/1981 | Keedy | 296/1 S |

FOREIGN PATENT DOCUMENTS

| | | | |
|---|---|---|---|
| 570763 | 2/1959 | Canada | 296/165 |
| 7630043 | 10/1976 | France | 296/1 S |

Primary Examiner—Robert B. Reeves
Assistant Examiner—Dennis H. Pedder

[57] ABSTRACT

This invention relates to devices which reduce the aerodynamic drag of trucks. This invention provides means for reducing truck afterbody drag, or drag attributable to the trailing edge region of a truck body/trailer box. More specifically, this invention provides means for permitting rear side panels and rear closure members of a truck afterbody to be repositioned in such a manner that the equivalent aerodynamic blunt base area of the truck afterbody is reduced, and the aerodynamic drag coefficient attributable to the truck afterbody is reduced. The left and right rear side panels of the truck afterbody can be moved to positions wherein the average span between the trailing edges of the left and right rear side panels is reduced compared with the average span between the leading edges of the left and right rear side panels, thus creating an effective taper to the truck afterbody.

20 Claims, 16 Drawing Figures

TRUCK AFTERBODY DRAG REDUCING DEVICE

BACKGROUND OF THE INVENTION

This invention relates to devices which reduce the aerodynamic drag of motorized road vehicles such as articulated and nonarticulated trucks. This invention more specifically relates to devices which reduce truck drag by altering the external geometry of the truck afterbody.

It is well known that the large blunt base area typically found in the trailing edge region of a truck body/trailer box is a major source of aerodynamic drag. The airflow in the region behind the flat blunt base trailing edge is almost always completely separated, and typically base pressure coefficients are found to be of the order of −0.2 (see for example Reference 1). To improve this situation, add-on trailing edge fairings which have streamlined tapering surfaces have been proposed in the prior art. These devices, sometimes inflatable (for example McDonald, U.S. Pat. No. 4,006,932), can reduce the equivalent aerodynamic blunt base area of the truck body on which they are installed. However, the use of these devices entails several disadvantages. Perhaps most importantly, many trucks already have lengths at the legal limits, and the use of long trailing edge streamline fairings on already long trucks would further compound existing safety and traffic problems on the highways. Another disadvantage of existing fairing devices is that they are difficult to stow away when not in use. These devices are also likely to block or interfere with the operation of rear loading door(s) on the truck body. Finally, the existing devices may also involve significant weight and initial cost penalties.

SUMMARY OF THE INVENTION

Accordingly several objects of my invention are as follows:

It is an object of my invention to provide a truck afterbody device which reduces the aerodynamic drag of the truck on which it is installed and deployed.

It is an object of my invention to provide a truck afterbody device which can reduce the equivalent aerodynamic blunt base area of the truck body on which it is installed and deployed.

It is an object of my invention to provide a truck afterbody drag reducing device which does not cause the truck on which it is installed and deployed to exceed legal truck length limits.

It is an object of my invention to provide a truck afterbody drag reducing device which is easily convertible from a stowed to a deployed configuration, and vice versa.

It is an object of my invention to provide a truck afterbody drag reducing device which does not interfere with rear door opening or closing operations.

It is an object of my invention to provide a truck afterbody drag reducing device of not excessive cost or weight.

Further objects and advantages of my invention will become apparent from a complete consideration of this specification and the accompanying drawings.

The basic concept of my invention, which enables it to meet the cited objects of the invention, involves the use of means permitting the repositioning of the rear side panels and the rear door(s) of a truck afterbody to a reduced drag configuration; rather than the prior art use of fairings added on *behind* an unreconfigured truck afterbody.

DETAILED DESCRIPTION

It is appropriate to start the detailed description by defining the meanings certain words and expressions are to be understood to convey, in the descriptive portion of this specification and in the appended claims.

The expression 'truck afterbody' is to be understood to refer to the aft portion of the body of an articulated or nonarticulated truck. Note that the basic truck afterbody is not to be construed to include any deployable fairings behind it. For example, the truck afterbody shown in FIG. 1 may be the afterbody of the trailer box of a tractor-trailer truck, or the aft portion of the body of a nonarticulated truck. Among articulated trucks the truck afterbody may refer to the afterbody of a semi-trailer or a full trailer van.

The word 'position' and word derivatives thereof are to be understood in the following sense. The position of a rigid body with respect to some axis system is specified by six independent variables—three translational position variables and three rotational position variables (such as the Euler angles).

The term 'edge', as used in 'leading edge', 'trailing edge', 'inner edge', and 'outer edge', is to be broadly understood in the sense of an edge region, and not narrowly understood as that line which is the extreme edge. Note also that 'leading' is towards the front, 'trailing' is towards the back, 'inner' is towards the plane of symmetry, and 'outer' is away from the plane of symmetry.

The term 'equivalent aerodynamic blunt base area' is defined as follows:

(Equivalent aerodynamic blunt base area of reconfigured afterbody) =

(Physical blunt base area of unreconfigured afterbody) ×

$$(\int\int C_{P_{\text{reconfigured}}} \vec{x} \cdot \vec{dA}) \div (\int\int C_{P_{\text{unreconfigured}}} \vec{x} \cdot \vec{dA})$$

Here the double integrals are to be taken over the entire afterbody surface, including the rear side panels. Pressure coefficients are denoted by $C_P$. $\hat{x}$ is a unit vector pointing backwards. $\vec{dA}$ is a vector whose length denotes the infinitesimal surface area associated with a point on the afterbody surface, and whose direction is the outward normal to the surface tangent plane at said point. $\hat{x} \cdot \vec{dA}$ is a vector dot product.

Figure 1:
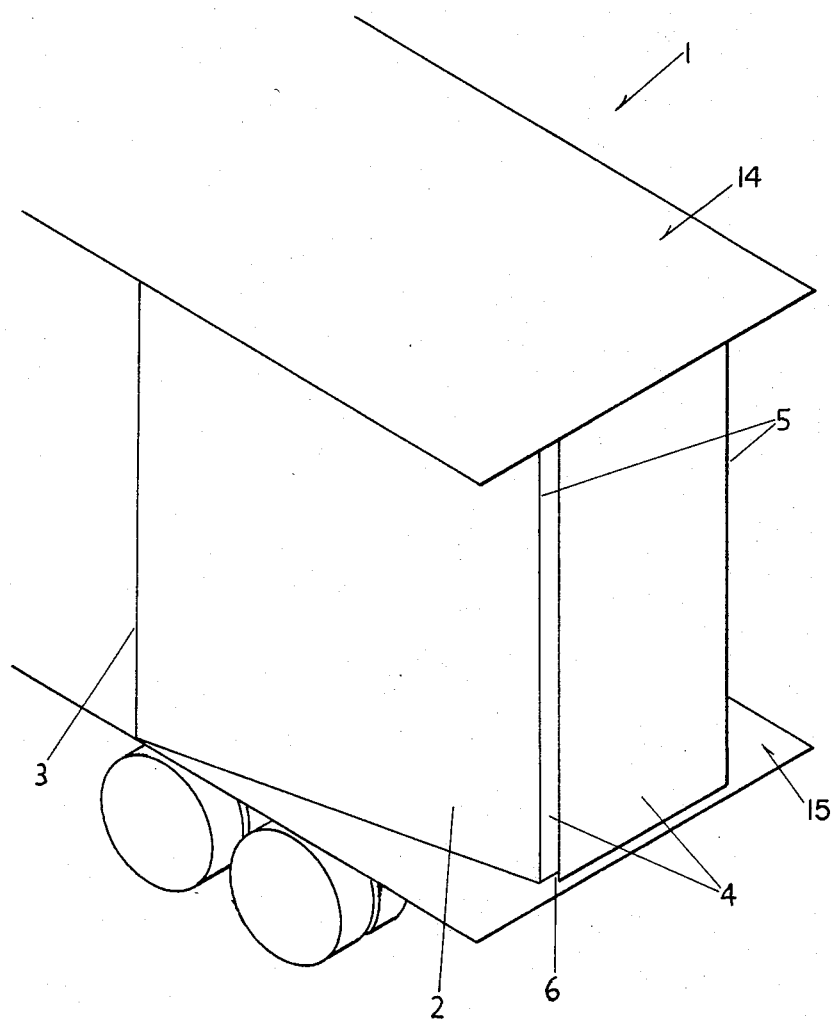
FIG. 1 shows an isometric view of an embodiment of the invention as employed in a truck afterbody, viewed from behind, to the left, and above said truck afterbody.

Having defined some terms, it is appropriate to next consider in detail the embodiments of the invention shown in the various Figures. FIG. 1 shows an embodiment of the invention in a truck afterbody 1. The embodiment of the invention illustrated here shows a truck afterbody with a conventional, fixed roof 14 and a conventional, fixed floor 15 enclosing the top and bottom of the interior region of the truck afterbody. The sides of the interior region are enclosed by rear side panels 2, and the rear of the interior region is enclosed by rear doors 4. Only the left rear side panel is shown in FIG. 1, as the right rear side panel is hidden in the view shown here. The top and bottom edges of the rear side panels, as well as the rear doors, are not permanently affixed to the roof and floor of the truck afterbody. As illustrated, the rear side panels 2 are hingedly attached at their leading edges to either side of said truck afterbody 1. The hinged attachment of the rear side panels along their leading edge hingelines 3, serves as means for permitting these panels to be moved from positions wherein the average span between the trailing edges of said rear side panels is substantially equal to the average span between the leading edges of said rear side panels, to positions wherein the average span between the trailing edges of said rear side panels is reduced compared with the average span between the leading edges of said rear side panels. The rear doors 4 are hingedly attached by their outer edges to the trailing edges of said rear side panels 2. The hingelines along which the rear doors are attached to the rear side panels are designated 5. It is to be understood that all the hingelines shown in all the Figures may be slightly offset or offsetable, within the scope of the invention. The line along which the rear doors may be contiguously secured is designated 6. Note that the illustrated embodiment of the invention is deployed with the right rear door overlapping the left rear door, behind said left rear door. Alternatively the left rear door may overlap behind the right rear door. The rear doors may also be alternatively secured in overlapping positions at locations other than the line 6.

Figure 2:
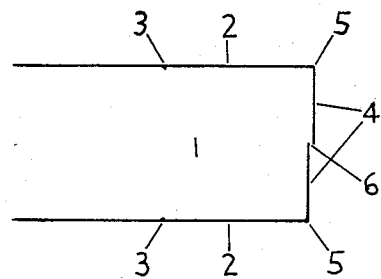
FIGS. 2 through 15 show diagrammatic horizontal cross-sectional views of a truck afterbody equipped with various embodiments of the present invention. The horizontal cross-sectional plane lies above the bottom surface of the truck afterbody and below the top surface of the truck afterbody, and is viewed from above. The front of the truck lies to the left of the drawings of FIGS. 2 through 15.
Figure 3:
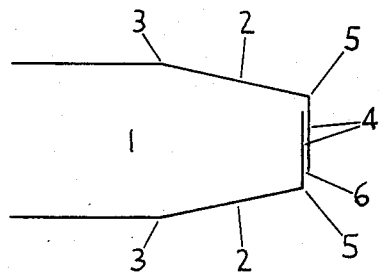

FIGS. 2 and 3 show cross-sectional views of the same basic invention illustrated in FIG. 1. FIGS. 2 and 3 now show the truck afterbody drag reducing device in undeployed and deployed configurations, respectively. Note that the longitudinally offset positioning of the left and right rear doors 4, serves as the preferred means for permitting said rear doors to at least partially overlap. The truck afterbody drag reducing device may be repositioned from its undeployed configuration to its deployed configuration, and vice versa, either manually or by means of some motorized or powered mechanism(s). Such motorized or powered mechanism(s) can serve as means for moving the rear side panels to positions wherein the average span between the trailing edges of the left and right rear side panels is reduced compared with the average span between the leading edges of said left and right rear side panels. Again, the rear doors may be secured in the illustrated positions by a variety of means. The rear doors, in their overlapping closed positions, may be secured to the roof and floor of the truck afterbody, and/or directly to each other somewhere in the region in which they overlap, as for example the illustrated location 6. Means for securing the rear doors and rear side panels in their undeployed and deployed positions, can include a variety of conventional clamp/fastener means. Note that the rear doors 4 may be conventionally opened from the positions shown in FIG. 2. It may also be possible for the rear side panels 2 to be swung outwards, to provide an even larger opening for access to the interior of the truck afterbody 1.

Figure 4:
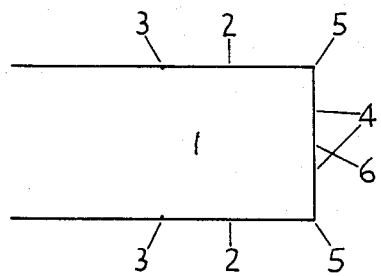
Figure 5:
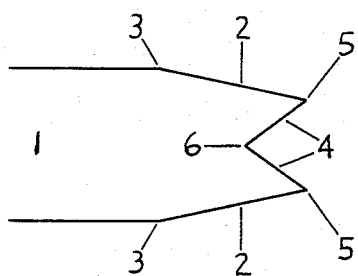

FIGS. 4 and 5 show an embodiment of the invention in its undeployed and deployed configurations, respectively. Here the inner edges of the rear doors 4 are contiguously secured at line 6, in both the undeployed and the deployed configurations. Note that the peripheral length from the leading edge of the left rear side panel to the leading edge of the right rear side panel, measured along the rear side panels and the rear doors, remains unaltered as the rear side panels and rear doors are moved from their closed undeployed configuration to their closed deployed configuration. Indeed, the constancy of this peripheral length is a necessary geometric condition for this embodiment of the invention when the inner edges of the rear doors are contiguously secured, unless the rear side panels or rear doors are significantly stretchable or compressible!

In FIG. 5 the constancy of the peripheral length is accomplished by moving forward the line 6 along which the inner edges of the rear doors are contiguously secured, as the span between the outer edges of the left and right rear doors is reduced. Means for the inner edges of the rear doors to be contiguously secured can again be a variety of conventional clamp/fastener means. The doors may be secured to each other or to the roof and floor, or both. Now a 'cavity' is formed with the rear doors on the sides and the roof and floor of the truck afterbody on the top and bottom. Such a cavity can result in the production of less negative base pressure coefficients. The use of cavities to produce this effect is discussed in References 1 and 3. Thus the afterbody drag can be reduced in this embodiment not only by the reduction of the *physical* blunt base area but also by the increased base pressures obtainable with this afterbody reconfiguration. Both these effects may however be included as means for reducing the *equivalent aerodynamic* blunt base area. Means for ventilating this cavity, as for example through vents in the roof and/or floor, may also be optionally provided.

Figure 6:
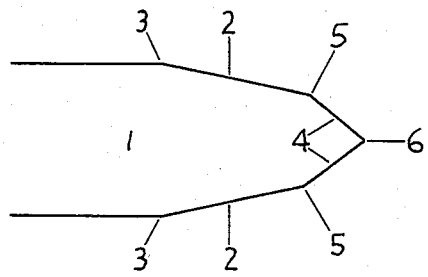

FIG. 6 shows an embodiment of the invention as deployed, in which the said peripheral length is maintained constant by moving backwards the line along which the inner edges of the rear doors are contiguously secured, as the span between the outer edges of the left and right rear doors is reduced. The embodiment of FIG. 5 has as advantages over the embodiment of FIG. 6 the features of the truck length not being increased in the deployed position, and of not having need of roof or floor extensions to fully enclose the truck afterbody with the invention in the deployed position.

Figure 7:
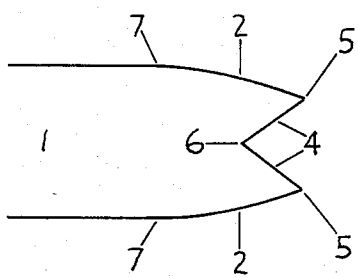

FIG. 7 shows an embodiment of the invention wherein rear bendable side panels 2 are actually bent into the curved deployed positions shown. The leading edges of the rear side panels are now nonhingedly attached to either side of the truck afterbody 1—the nonhinged attachment points are designated 7. This embodiment is especially advantageous for reducing drag as it provides a smooth, streamlined afterbody taper.

Figure 8:
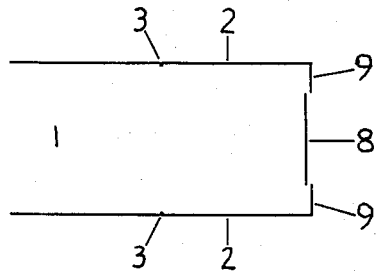

FIG. 8 shows an embodiment of the invention fitted with three vertically retractable rollaway doors instead of the two rear doors 4. Here the central vertically retractable rollaway door is designated 8 and the outer vertically retractable rollaway doors are designated 9. FIG. 8 shows the invention in its undeployed configuration. The details of the support structures for the rollaway doors are not critical to the invention, and so are not shown.

Figure 9:
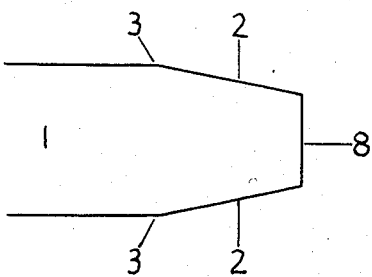

FIG. 9 shows the embodiment of FIG. 8 in its deployed configuration. The outer vertically retractable rollaway doors 9 have been retracted and so are not visible here. The central vertically retractable rollaway door 8 is unretracted. The rear side panels 2 have been moved to positions wherein the span between their trailing edges is reduced compared with the span between their leading edges.

Figure 10:
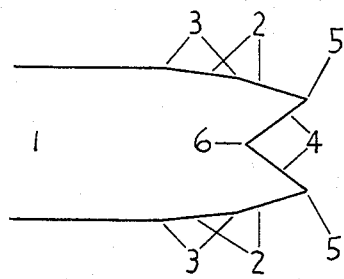

FIG. 10 shows an embodiment of the invention incorporating two rear side panels 2 on each side of the truck afterbody 1. The hingelines at the leading edges of each rear side panel are again designated 3. This embodiment is shown in a deployed position, and has as an advantage over the embodiment of FIG. 5 the fact that the double taper of the afterbody sides more closely approximates a curved, 'streamline' surface.

Figure 11:
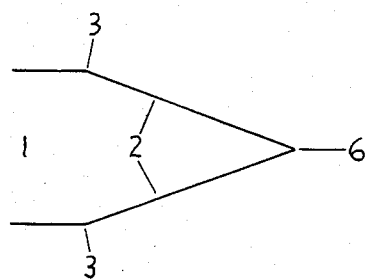

FIG. 11 shows a deployed embodiment of the invention with the span between the rear side panels 2 tapering to close to zero at their trailing edges, and with the rear closure means fully retracted and not shown. Preferably the rear closure means will here comprise one or more vertically retractable rollaway doors, but other rear closure means may also be used. Now the trailing edges of the rear side panels 2 are contiguously secured at location 6. To prevent flow separation on the surfaces of the rear side panels in this embodiment, these panels may need to be be quite long.

Figure 12:
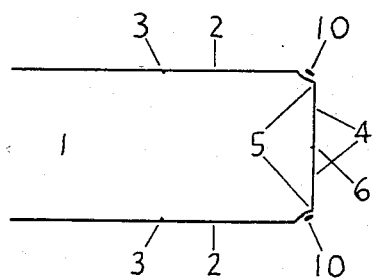
Figure 13:
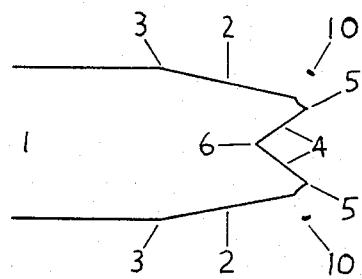

FIGS. 12 and 13 show an embodiment in undeployed and deployed configurations, which is similar to the embodiment of FIGS. 4 and 5, but which also has non-laterally-translatable, substantially vertical posts 10 located at the rear side corners of the truck afterbody 1. These posts will typically extend from the floor to the roof of the truck afterbody, and may also act as airflow guide vanes 10' for the invention in the deployed configuration, as shown in FIG. 13. The airflow guide vanes 10 on either side of the truck afterbody will preferably be shaped with streamlined airfoil sections, and oriented so that the span between their trailing edges is reduced compared with the span between their leading edges, as illustrated.

Figure 14:
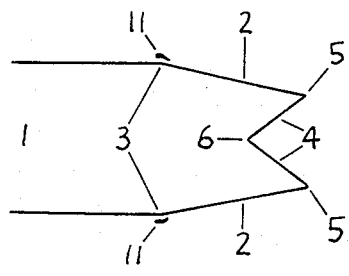

FIG. 14 shows an embodiment similar to that of FIG. 5, but now having airflow guide vanes 11 just outboard of the hingelines at the rear side panels' leading edges 3. These guide vanes serve as means for enhancing flow attachment on the surfaces of the rear side panels 2. The guide vanes 11 may or may not be retractable.

Figure 15:
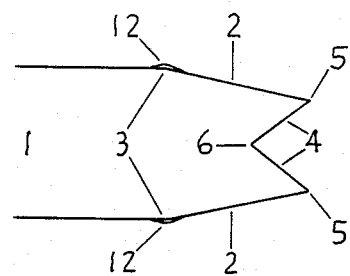

Flow attachment on the surfaces of the rear side panels can alternatively be enhanced by using flexible curved fairing sheets 12 outside the hingelines 3, rather than the guide vanes 11. This is illustrated in FIG. 15. Boundary Layer Control is yet another means for enhancing flow attachment along the surfaces of the rear side panels. Suction or blowing may be used for boundary layer control. Also, boundary layer energizing devices such as vortex generators may be mounted on the side or rear side surfaces of the truck afterbody, again to improve flow attachment on the rear side panels in their deployed (tapered) configurations.

Note here that while the rear closure means shown (in their deployed positions) in FIGS. 7, 10, 13, 14, and 15 correspond to that shown in FIG. 5, clearly the rear closure means of FIGS. 6, 3, 9, or 11 could alternatively be combined with the rear side panel concepts and other concepts of FIGS. 7, 10, 13, 14, and 15.

Figure 16:
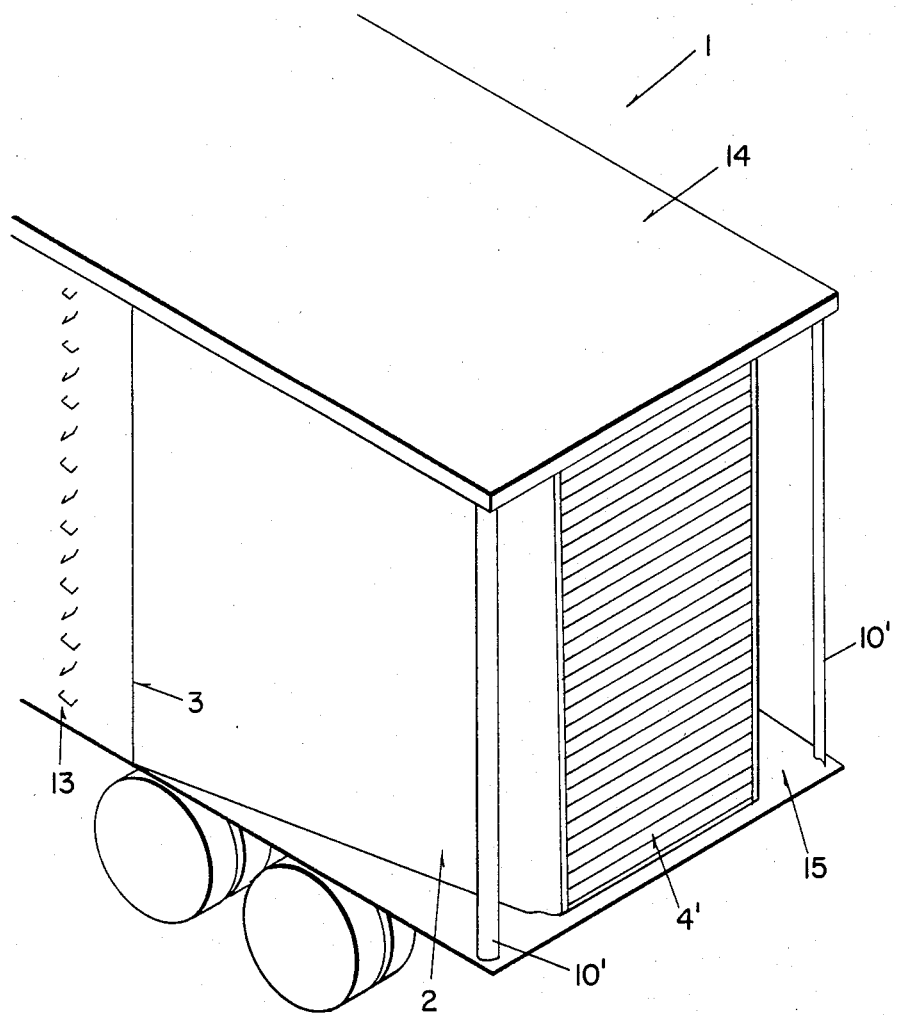
FIG. 16 shows an isometric view from behind, to the left, and above, of an embodiment of the invention with airflow guide vanes, vortex generators, and vertically retractable rollaway doors.

FIG. 16 shows another embodiment of the invention. Here the truck afterbody 1 has a fixed roof 14 enclosing the top of the rear interior region of the truck afterbody, a fixed floor 15 enclosing the bottom of said rear interior region, and rear side panels 2 enclosing the sides of said rear interior region. With the rear side panels in the illustrated configuration, the rear of said rear interior region is enclosed by a vertically retractable rollaway door 4'. Note that in this embodiment an additional vertically retractable rollaway door is provided on either side of the illustrated central door. These additional doors are not visible in this illustration, as they are in their preferred retracted positions when the rear side panels are positioned in the illustrated configuration. The embodiment of FIG. 16 has substantially vertical posts 10' located at the rear side corners of the truck afterbody, which posts act as airflow guide vanes when the rear side panels are positioned in the illustrated configuration. The embodiment of FIG. 16 is also fitted with boundary layer energizing devices 13 forward of the hingeline 3. These boundary layer energizing devices comprise vortex generators in the illustrated embodiment, and improve flow attachment on the rear side panels 2, when the rear side panels are positioned in the illustrated configuration.

This completes the detailed description of specific features of the illustrated embodiments of the invention. Consideration may now be given to the preferred mode of carrying out the invention. In the preferred mode two rear doors are hingedly attached at their outer edges to the trailing edges of rear side panels, which in turn are hingedly attached at their leading edges to the truck afterbody proper. This corresponds with the illustrations of FIGS. 1 through 5. When a full volume load is being carried in the truck body, the afterbody enclosure, comprising the rear side panels and the rear doors, can be secured in a conventional box geometry, as shown in FIGS. 2 and 4. When a partial load is being carried, the rear side panels and the rear doors can be moved to and secured in one or more reconfigured positions such as those illustrated in FIGS. 1, 3, and 5, wherein the span between the trailing edges of the rear side panels is reduced compared with the span between the leading edges of the rear side panels. By adding this geometrical taper to the truck afterbody, the equivalent aerodynamic blunt base area of the truck afterbody may be reduced, and so the aerodynamic drag coefficient attributable to the truck afterbody may be reduced. Note that drag reductions in the truck forebody which arise due to the reconfiguration of the truck afterbody are also to be counted as attributable to the truck afterbody. Thus, in the preferred mode recited, a drag reduction and consequent fuel economy improvement may be obtained by deploying the invention on a truck afterbody, when the truck body is carrying less than a full volumetric load.

Besides the preferred embodiment, the other described embodiments may also be used in a similar manner, and for a similar purpose. The invention may be built in as original equipment on truck afterbodies and/or retrofitted on truck afterbodies heretofore not employing the invention.

While the illustrated embodiments of the invention and the preferred mode of carrying out the invention have been described in detail above, it is to be understood that further modifications and variations may be made within the spirit and scope of the invention as defined in the appended claims.

REFERENCES

1. W. T. Mason, Jr. and P. S. Beebe, 'Truck and Bus Drag'
2. D. J. Maull, 'Mechanisms of Base Drag'
3. W. A. Mair, 'Drag-Reducing Techniques'

All of the above referenced articles are compiled in: *Aerodynamic Drag Mechanisms of Bluff Bodies and Road Vehicles*, edited by G. Sovran et. al., documenting the 1976 General Motors Research Laboratories Symposium on Aerodynamic Drag Mechanisms of Bluff Bodies and Road Vehicles, and published by Plenum Press, New York, 1978.

What is claimed is:

1. An improved cargo containing truck afterbody of the type which includes in combination a fixed roof and a fixed floor on the top and bottom of the interior region of said truck afterbody, fixed front side panels on the front sides of said interior region, and rear closure members to the rear of said interior region, wherein the improvement comprises:

movable rear side panels attached at their leading edges to said fixed front side panels and at their trailing edges to said rear closure members;

the cargo containing afterbody volume partially bounded by said rear side panels;

and means for permitting said rear side panels and said rear closure members to be repositioned in such a manner that the equivalent aerodynamic blunt base area of said truck afterbody is reduced and the aerodynamic drag coefficient attributable to said truck afterbody is reduced, wherein in the repositioned configuration of the rear side panels and rear closure members the truck afterbody length is not increased.

2. The improved truck afterbody of claim 1, wherein said means include means for permitting said rear side panels to be moved to positions wherein the average span between the trailing edges of said rear side panels is reduced compared with the average span between the leading edges of said rear side panels.

3. The improved truck afterbody of claim 1, wherein said rear closure members comprise left and right rear doors.

4. The improved truck afterbody of claim 1, wherein said rear closure members comprise at least one vertically retractable rollaway door.

5. The improved truck afterbody of claim 1, further comprising non-laterally-translatable, substantially vertical posts located at the rear side corners of said truck afterbody.

6. The improved truck afterbody of claim 5,
   wherein said means include means for permitting said rear side panels to be moved to positions wherein the average span between the trailing edges of said rear side panels is reduced compared with the average span between the leading edges of said rear side panels, • and further provided with means for said posts to act as airflow guide vanes when said rear side panels have been moved to positions wherein the average span between the trailing edges of said rear side panels is reduced compared with the average span between the leading edges of said rear side panels.

7. The improved truck afterbody of claim 1, provided with more than one of the said rear side panels on each side of said truck afterbody.

8. An improved cargo containing truck afterbody of the type which includes in combination a fixed roof and a fixed floor on the top and bottom of the interior region of said truck afterbody, fixed left and right front side panels on the left and right front sides of said interior region, and left and right rear closure members to the rear of said interior region, wherein the improvement comprises:

movable left and right rear side panels attached at their leading edges to said fixed left and right front side panels and at their trailing edges to said left and right rear closure members;

the cargo containing afterbody volume partially bounded by said left and right rear side panels;

and means for permitting said left and right rear side panels to be moved to positions wherein the average span between the trailing edges of said left and right rear side panels is reduced compared with the average span between the leading edges of said left and right rear side panels, wherein the truck afterbody length is not increased in the configuration with reduced span between the trailing edges of the left and right rear side panels.

9. The improved truck afterbody of claim 8, wherein said means comprise hinge mounting means for permitting said left and right rear side panels to be pivotable about their leading edges, to positions wherein the average span between the trailing edges of said left and right rear side panels is reduced compared with the average span between the leading edges of said left and right rear side panels.

10. The improved truck afterbody of claim 8, wherein said means comprise said left and right rear side panels being bendable to positions wherein the average span between the trailing edges of said left and right rear side panels is reduced compared with the average span between the leading edges of said left and right rear side panels.

11. The improved truck afterbody of claim 8, wherein the moving of said left and right rear side panels to positions wherein the average span between the trailing edges of said left and right rear side panels is reduced compared with the average span between the leading edges of said left and right rear side panels serves as means for reducing the aerodynamic drag coefficient of said truck afterbody, as compared with the aerodynamic drag coefficient of said truck afterbody prior to the moving of said left and right rear side panels.

12. The improved truck afterbody of claim 8, wherein the improvement further comprises means for enhancing flow attachment along the surfaces of said left and right rear side panels, when said left and right rear side panels have been moved to positions wherein the average span between the trailing edges of said left and right rear side panels is reduced compared with the average span between the leading edges of said left and right rear side panels.

13. The improved truck afterbody of claim 8, wherein the improvement further comprises boundary layer energizing devices on the left and right sides of said truck afterbody, which boundary layer energizing devices serve as means for improving airflow attachment on said left and right rear side panels, when said left and right rear side panels have been moved to positions wherein the average span between the trailing edges of said left and right rear side panels is reduced compared with the average span between the leading edges of said left and right rear side panels.

14. The improved truck afterbody of claim 8, further comprising non-laterally-translatable, substantially vertical posts located at the left and right rear side corners of said truck afterbody.

15. The improved truck afterbody of claim 14, with means for said posts to act as airflow guide vanes when said left and right rear side panels have been moved to positions wherein the average span between the trailing edges of said left and right rear side panels is reduced compared with the average span between the leading edges of said left and right rear side panels.

16. The truck afterbody of claim 8, wherein said means comprise means for permitting said left and right rear side panels to be moved from positions wherein the average span between the trailing edges of said left and right rear side panels is substantially equal to the average span between the leading edges of said left and right rear side panels, to positions wherein the average span between the trailing edges of said left and right rear side panels is reduced compared with the average span between the leading edges of said left and right rear side panels.

17. An improved cargo containing truck afterbody of the type which includes in combination a conventional fixed roof and a fixed floor on the top and bottom of the interior region of said truck afterbody, fixed front side panels on the front sides of said interior region, and rear doors to the rear of said interior region, wherein the improvement comprises:

movable rear side panels attached at their leading edges to said fixed front side panels;

the rear doors hingedly attached at their outer edges to the trailing edges of said rear side panels;

the cargo containing afterbody volume partially bounded by said rear side panels and said rear doors;

and means for permitting said rear side panels to be moved to positions wherein the average span between the trailing edges of said rear side panels is reduced compared with the average span between the leading edges of said rear side panels, wherein the truck afterbody length is not increased in the configuration with reduced span between the trailing edges of the rear side panels.

18. The truck afterbody closure of claim 17, wherein said rear side panels are hingedly attached at their leading edges to either side of said truck afterbody.

19. The truck afterbody closure of claim 17, with means for the inner edges of said rear doors to be contiguously located at positions closer to the center of said interior region as said rear side panels are moved to positions wherein the average span between the trailing edges of said rear side panels is reduced compared with the average span between the leading edges of said rear side panels.

20. The truck afterbody closure of claim 17, with means for permitting said rear doors to at least partially overlap, one behind the other, when said rear side panels have been moved to positions wherein the average span between the trailing edges of said rear side panels is reduced compared with the average span between the leading edges of said rear side panels.

* * * * *